United States Patent
Sokun et al.

(10) Patent No.: US 12,206,606 B2
(45) Date of Patent: Jan. 21, 2025

(54) ENHANCED RETRANSMISSION SCHEME FOR INDEX MODULATION IN NOMA

(71) Applicant: Telefonaktiebolaget LM Ericsson (publ), Stockholm (SE)

(72) Inventors: Hamza Sokun, Ottawa (CA); Ali Afana, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 197 days.

(21) Appl. No.: 18/009,933

(22) PCT Filed: Jun. 25, 2020

(86) PCT No.: PCT/IB2020/056034
§ 371 (c)(1),
(2) Date: Dec. 12, 2022

(87) PCT Pub. No.: WO2021/260419
PCT Pub. Date: Dec. 30, 2021

(65) Prior Publication Data
US 2023/0224109 A1    Jul. 13, 2023

(51) Int. Cl.
*H04L 5/00* (2006.01)
*H04L 27/34* (2006.01)

(52) U.S. Cl.
CPC .......... *H04L 5/0037* (2013.01); *H04L 5/0044* (2013.01); *H04L 27/345* (2013.01); *H04L 27/3488* (2013.01)

(58) Field of Classification Search
None
See application file for complete search history.

(56) References Cited

U.S. PATENT DOCUMENTS

| | | | |
|---|---|---|---|
| 10,581,662 B2* | 3/2020 | Atungsiri | H04B 7/022 |
| 11,418,248 B2* | 8/2022 | Kuo | H04L 5/0048 |
| 2019/0089494 A1* | 3/2019 | Park | H04L 1/1812 |

FOREIGN PATENT DOCUMENTS

WO    2019069168 A1    4/2019

OTHER PUBLICATIONS

3GPP, "3rd Generation Partnership Project; Technical Specification Group Radio Access Network; Study on Downlink Multiuser Superposition Transmission (MUST) for LTE (Release 13)", 3GPP TR 36.859 V13.0.0, Dec. 2015, 1-48.

(Continued)

*Primary Examiner* — Diane L Lo
(74) *Attorney, Agent, or Firm* — Murphy, Bilak & Homiller, PLLC

(57) ABSTRACT

A method in a transmitter comprises transmitting a first data block to a first user, using an index modulation scheme and using SSD for transmitting the first data block. In some embodiments, the index modulation scheme is index-modulated OFDM and the indices comprise subcarrier indices. The method further comprises determining that a retransmission of the first data block to the first user is needed, and rearranging a bit mapping of bits in the first data block to indices used in the index modulation scheme, compared to a bit mapping previously used for transmitting the first data block to the first user using the index modulation scheme. The method further comprises retransmitting the second data block to the first user, where this retransmitting comprises using the index modulation scheme with the rearranged bit mapping and using SSD.

22 Claims, 8 Drawing Sheets

(56) References Cited

OTHER PUBLICATIONS

Basar, Ertugrul, "Index Modulation Techniques for 5G Wireless Networks", IEEE Communications Magazine, vol. 54, No. 7, Jul. 2016, 168-175.
Basar, Ertugrul et al., "Orthogonal Frequency Division Multiplexing With Index Modulation", IEEE Transactions on Signal Processing, vol. 61, No. 22, Nov. 15, 2013, 5526-5549.
Boutros, Joseph, et al., "Signal Space Diversity: A Power- and Bandwidth-Efficient Diversity Technique for the Rayleigh Fading Channel", IEEE Transactions on Information Theory, vol. 44, No. 4, Jul. 1998, 1453-1467.
Chatziantoniou, Eleftherios, et al., "Non-Orthogonal Multiple Access with Multi-carrier Index Keying", School of Electronics, Electrical Engineering and Computer Science, Queen's University Belfast Belfast, BT7 1NN, United Kingdom, 2017, 1-5.
Ding, Zhiguo, et al., "Application of Non-Orthogonal Multiple Access in LTE and 5G Networks", IEEE Communications Magazine, vol. 55, No. 2, Feb. 2017, 185-191.
Inácio, Juliana C., et al., "Exploiting Signal Space Diversity in OFDM With Grouped Subcarriers: Going Beyond Subcarrier Index Modulation", IEEE Wireless Communications Letters, vol. 7, No. 4, Aug. 2018, 1-4.
Sediq, Akram Bin, et al., "Generalized Constellation Rearrangement in Cooperative Relaying", Proceedings 71st IEEE VTC—Spring, Taipei, Taiwan, May 2010, 1-5.
Sediq, Akram Bin, et al., "Near-Optimal Non-uniform Constellation Rearrangement for Cooperative Relaying", 25th Biennial Symposium on Communications, Kingston, ON, Canada, May 2010, 159-162.
Yuan, Yifei, et al., "Non-Orthogonal Transmission Technology in LTE Evolution", IEEE Communications Magazine, vol. 54, No. 7, Jul. 2016, 68-74.

* cited by examiner

ENHANCED RETRANSMISSION SCHEME FOR INDEX MODULATION IN NOMA

TECHNICAL FIELD

Certain embodiments of the present disclosure relate, in general, to wireless communications and more particularly to a retransmission scheme using OFDM-index modulation and signal space diversity (SSD).

BACKGROUND

Traditional digital modulation schemes depend on the modulation of the amplitude, phase, and frequency of a sinusoidal carrier signal for transmission of digital data. A technique called index modulation uses other dimensions for data transmission. Particularly, this digital modulation technique conveys information by varying any of various transmit indices associated with the transmission, rather than or in addition to utilizing amplitudes/frequency/phases. These transmit indices may correspond to transmit antennas, subcarriers, radio frequency mirrors, transmit light emitting diodes, relays, modulation types, time slots, precoder matrices, dispersion matrices, spreading codes, signal powers, loads, and the like. For example, with a multi-antenna transmission scheme, the choice of which antenna or antennas are used to transmit the signal at a given time can indicate one or more bit values, so long as the receiver is able to distinguish between transmissions from different antennas. See E. Basar, "Index modulation techniques for 5G wireless networks," IEEE Commun. Mag., vol. 54, no. 7, pp. 168-175, July 2016.

Orthogonal frequency-division multiplexing (OFDM) with index modulation (OFDM-IM) is one approach to index modulation. See E. Basar, U. Aygolu, E. Panayirci, and H. V. Poor, "Orthogonal frequency division multiplexing with index modulation," IEEE Trans. Signal Process., vol. 61, no. 22, pp. 5536-5549, November 2013. With OFDM-IM, a subset of a predetermined range of subcarriers is used at any given time for transmitting the carrier signal; the particular subset used can change from one symbol time to another. The indices of the subcarriers used to transmit at a given symbol time are utilized to transmit information bits. Key advantages of OFDM-IM include that it is not only energy efficient, but also provides robustness against inter-carrier interference, since only a fraction of subcarriers is active at a given time. Hence, this technique may be especially suitable for energy-limited Internet of Things (IoT) devices.

Under poor symbol conditions, retransmission of a data block may be required. Retransmission schemes based on hybrid automatic repeat request (HARQ), including techniques that involve so-called "soft combining," where information from the original transmission and from the retransmission are combined, to enhance the probability of a successful demodulation and decoding of the data block, are well known and widely used.

To enhance the transmission reliability for orthogonal frequency-division multiple access (OFDMA) networks, these OFDM-IM and the retransmission with constellation rearrangement techniques can be combined. This was described in International Patent Application Publication No. WO2019/069168, by Ali Afana, A. Bin Sediq, Salama Ikki and Alex Stephenne, "Retransmission Scheme for OFDM-Index Modulation and Spatial Modulation," filed 20 Sep. 2018, the entire contents of which are incorporated by reference herein. The motivation behind this combined scheme is not only to exploit symbol-mapping diversity to improve transmission reliability, but to do so while also conveying additional information bits via the OFDM-IM scheme.

To improve the overall system capacity of conventional orthogonal multiple access (OMA) schemes, such as OFDMA, so-called non-orthogonal multiple access (NOMA) has been proposed as an effective technique. In contrast to OMA schemes that allocates orthogonal communication resources to each user to eliminate interference, NOMA schemes allow multiple users to be accommodated on the same communication resource. In this way, they can be able to support many device connections to the network. Generally, NOMA schemes can be grouped into two main categories: power-domain multiplexing and code-domain multiplexing.

In power-domain NOMA, different users are assigned different transmit powers based on channel conditions experienced. In standardization discussions undertaken by members of the 3rd-Generation Partnership Project have explored using a power-domain NOMA technique called multi-user superposition transmission, or MUST. See 3GPP TR 36.859, "Study on Downlink Multiuser Superposition Transmission (MUST) for LTE (Release 13)." According to this approach, higher transmit powers are allocated to the users with weaker channel conditions to reduce the impact of interference from the users with stronger channel conditions. At the receivers, successive interference cancellation (SIC) is used for decoding the signals, and it is applied in the descending order of the signal strengths. In this way, power-domain NOMA can strike a good balance between system throughput and fairness among user throughputs. See Yuan, Yifei, et al. "Non-orthogonal transmission technology in LTE evolution." IEEE Commun. Mag., vol. 54, no. 7, pp. 68-74, July 2017. Since NOMA allows to support multiple users on the same physical resource, it is another candidate to support many IoT devices in the networks. See Ding, Zhiguo, et al. "Application of non-orthogonal multiple access in LTE and 5G networks." IEEE Commun. Mag., vol. 55, no. 2, pp. 185-191, February 2017.

The combination of NOMA with OFDM-IM techniques has also been considered. See, e.g., Chatziantoniou, Eleftherios, Youngwook Ko, and Jinho Choi. "Non-orthogonal multiple access with multi-carrier index keying." in Proc. $23^{rd}$ European Wireless Conference, Dresden, Germany, August 2017, pp. 205-209.

With increasing demands for higher system capacity with increased reliability and improved efficiency, further improvements in multiple access transmission techniques are needed.

SUMMARY

Another technique used to improve communications reliability is called signal space diversity (SSD). SSD exploits a diversity improvement resulting from spreading the constellation points in the modulation signal space. It is also called modulation diversity. In this technique, the original modulation constellation is first rotated by a certain rotation in such way that all constellation points have their own unique in-phase and quadrature-phase components. Then, the in-phase and quadrature-phase components of these points are sent over independent realizations of the channel.

As discussed in detail below, combining SSD with both OFDM-IM and retransmission techniques provides for a more robust system. These techniques can be further combined with NOMA techniques, for improved system capacity.

According to certain embodiments, a method in a transmitter includes the step of transmitting a first data block to a first user, using an index modulation scheme and using SSD for transmitting the first data block. In some embodiments, the index modulation scheme is index-modulated OFDM and the indices comprise subcarrier indices.

The method further comprises determining that a retransmission of the first data block to the first user is needed, and rearranging a bit mapping of bits in the first data block to indices used in the index modulation scheme, compared to a bit mapping previously used for transmitting the first data block to the first user using the index modulation scheme. The method further comprises retransmitting the second data block to the first user, where this retransmitting comprises using the index modulation scheme with the rearranged bit mapping and using SSD.

According to certain embodiments, a transmitter circuit includes a memory storing instructions and processing circuitry operable to carry out a method like that summarized above.

According to certain embodiments, a method in a receiver includes receiving a transmission of a first data block. The method further comprises the step of demodulating the received transmission of the first data block, where said demodulating comprises reversing an index modulation scheme and SSD used to transmit the first data block. In some embodiments, the index modulation scheme is index-modulated OFDM and the indices comprise subcarrier indices.

The method further comprises determining that a retransmission of the first data block is needed and continues with receiving a retransmission of the first data block. The method further includes demodulating the received retransmission of the first data block, where demodulating of the received retransmission comprises reversing an index modulation scheme and SSD used to retransmit the first data block. Here, reversing the index modulation scheme used to retransmit the first data block comprises using a rearranged bit mapping of bits in the first data block to indices used in the index modulation scheme, compared to a bit mapping previously used for transmitting the first data block to the first user using the index modulation scheme.

According to certain embodiments, a receiver circuit includes a memory storing instructions and processing circuitry operable to execute the instructions to cause the receiver to carry out a method like that summarized above.

Embodiments of the present disclosure may provide one or more technical advantages. As an example, a technical advantage may be that the disclosed techniques provide joint consideration of modulation diversity, advance modulation technique, index modulation, and power domain multiplexing of users on the same resource block (RB), thereby enhancing system capacity while maintaining transmission reliability. Advantages may further comprise improvement of the transmission reliability using retransmission, particularly, for users with weaker channel conditions.

Certain embodiments may include other advantages, as would be understood by a person having ordinary skill in the art.

DETAILED DESCRIPTION

Signal Space Diversity (SSD) is a technique that exploits the diversity improvement resulting from spreading the constellation points in the modulation signal space. In this technique, which is also called modulation diversity, a modulation constellation is first rotated by a certain rotation in such way that all constellation points have their own unique in-phase and quadrature-phase components. Then, when transmitting a symbol, in-phase and quadrature-phase components of the constellation point corresponding to the symbol are sent over independent realizations of the channel, e.g., in different time-slots. This is described in Boutros, Joseph, and Emanuele Viterbo, "Signal space diversity: a power- and bandwidth-efficient diversity technique for the Rayleigh fading channel," IEEE Trans. Inform. Theory vol. 44, pp. 1453-1467, July 1998.

In various embodiments of techniques described in detail below, SSD is combined with OFDM-IM and retransmission, for improved robustness of transmission. In additional embodiments, SSD and OFDM-IM are further combined with NOMA techniques, for improved system capacity.

As was discussed in the Background section above, transmission reliability for orthogonal frequency-division multiple access (OFDMA) networks can be combined by combining OFDM-IM and retransmission techniques. Adding SSD provides the additional benefits of modulation diversity. Adding NOMA provides further enhancements in system capacity, as it allows for communication with multiple users using resources that overlap in time and/or frequency.

Figure 1:
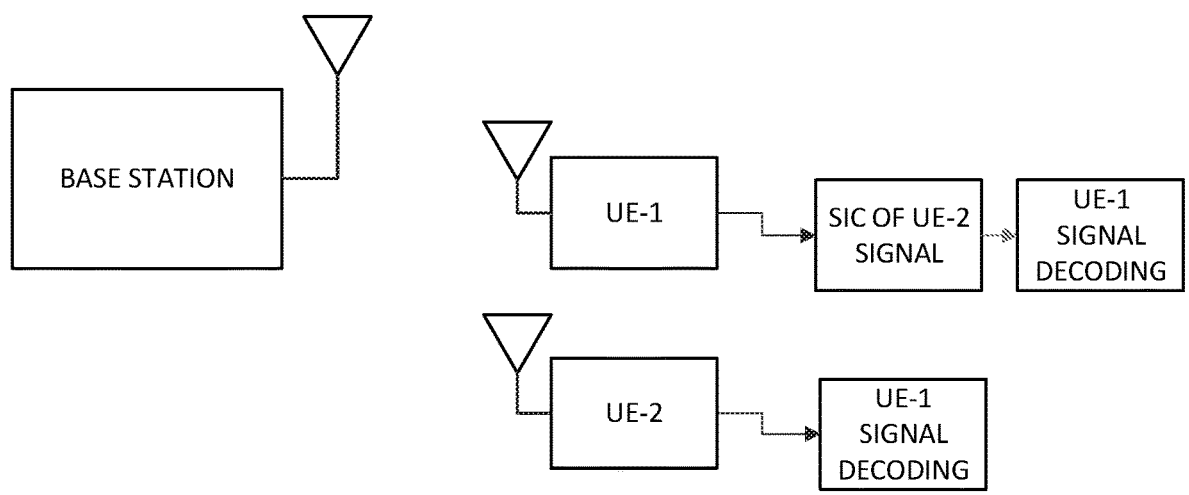
FIG. 1 illustrates an example non-orthogonal multiple access (NOMA) scenario.

FIG. 1 illustrates an example NOMA scenario. This is a simple scenario, where a base station (BS) 110 with a single antenna transmits a superposition of two symbols to two UEs UE-1 and UE-2, each of them with single antenna, using the same time-frequency resources, e.g., the same OFDMA resource block. The terms "user" and "UE" may be used interchangeably herein; both are meant to refer to the receiver of the transmitted signal.

In the scenario illustrated in FIG. 1 it may be assumed, for example, that UE-1 and UE-2 have been chosen based on a user-clustering algorithm, and the power allocation in this 2-user downlink NOMA cluster is pre-calculated based on a power allocation algorithm. User-clustering and power allocation algorithms for the purpose of performing power-domain NOMA are well known, and their details are not important for understanding the inventive concepts disclosed herein. For present purposes, it suffices to say that the UEs 120A and 120B can be selected and the power allocations made to these two UEs can be made in such a way that it is feasible for both UEs to demodulate and decode the respective signals.

The base station 110 transmits signals to UE-1 and UE-2 using a multiuser superposition transmission (MUST) scheme, which is a power-domain NOMA scheme. The transmitted signal is formed as $\hat{x}=x_1+x_2$, and $x_i=\sqrt{a_iP_t}s_i^j$, where $s_i^j$ is the j-th symbol for user i with $E[|s_i^j|^2]=1$, and $a_iP_t$ is the transmit power associated with $s_i^j$, where $a_i$ is the power allocation coefficient ($\Sigma_{i=1}^{2} a_i=1$), and $P_t$ is the total transmit power in the system. The channel gains of the users, $U_1$, and $U_2$ are respectively $H_1=|h_1|^2$, $H_2=|h_2|^2$, where $h_i$ is the complex channel coefficient between $U_i$ and BS, and $H_1>H_2$. It is assumed that the transmit power of the users is allocated in inverse proportion to their channel gains, and successive interference cancellation (SIC) may be employed at the receiver of users to reduce the interference from the other users on the same RB. In this scenario, UE-1 performs SIC to cancel interference arising from the signal for UE-2. More specifically, UE-1 is able to demodulate the signal targeted to UE-2 and then subtract a replicated version of UE-2's signal from the composite signal, leaving a residual signal that comprises primarily the signal targeted for UE-1. The interference from UE-2's signal having thus been removed, UE-1 is able to demodulate and decode the signal targeted for it. In the illustrated scenario, however, UE-2 is unable to demodulate the signal for UE-1 and thus use it to cancel interference from the composite signal. Because it has been allocated more power, UE-2 can demodulate and decode the signal targeted for it, despite the interference arising from the superposition of the signal for UE-1.

In a two-user NOMA system like that shown in FIG. 1, the achievable throughput $R_i$ for UE-1, i.e., the user performing SIC before demodulating its own signal, can be expressed as $$R_i = W\log_2\left(1 + \frac{a_iP_tH_i}{\Sigma_{j=1}^{i-1}a_jP_tH_i + WN_0}\right),$$

where W is the bandwidth of each RB, and $N_0$ is the power spectral density of additive white Gaussian noise (AWGN).

Figure 2:
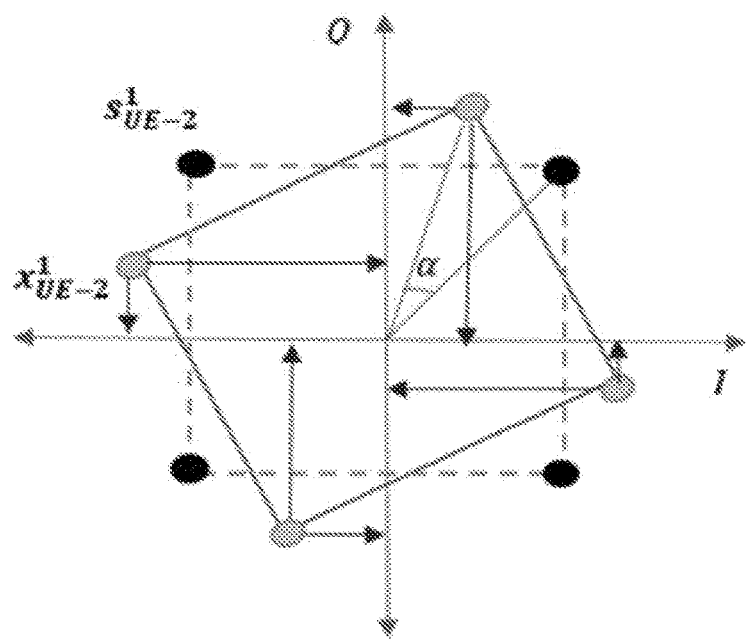
FIG. 2 illustrates constellation rotation.

FIG. 2 illustrates an example of constellation rotation, as used to form the constellation used for SSD, also known as modulation diversity. In this example, the starting constellation is a simple quadrature phase-shift keying (QPSK) constellation, illustrated with bold points connected by dashed lines and having four points corresponding to symbol values 00, 01, 10, 11. (The particular mapping of symbol values to the four constellation points is unimportant, so long as the receiver and transmitter are in agreement about the mapping.) It can be observed from FIG. 2, however, that constellation points in this original QPSK constellation share amplitudes in the I and Q dimensions. The upper-right and lower-right points, for example, have the same amplitude in the I dimension, as do the upper-left and lower-left points. The lower-left and lower-right points have the same amplitude in the Q dimension, as do the upper-left and upper-right points.

As seen in the figure, this QPSK constellation can be rotated by an angle α, e.g., by 26.6 degrees, so that this is no longer the case. In the rotated constellation $\mathcal{X}$, illustrated in FIG. 2 with lighter points connected by solid lines, no constellation point has an I-amplitude or Q-amplitude in common with the others.

Symbols for transmission are not mapped directly to constellation points in the rotated constellation $\mathcal{X}$, however. Instead, new constellation points in an expanded constellation $\Lambda$ are obtained by interleaving the components of pairs of signal points, such that, $\Lambda=\text{Re}\{\mathcal{X}\}\times\text{Im}\{\mathcal{X}\}$. For instance, assume that $x_{UE-2}^1$, and $x_{UE-2}^2$ are two signal points from the rotated constellation, $\mathcal{X}$. When the components of $x_{UE-2}^1$, and $x_{UE-2}^2$ are interleaved, the new constellation points will be as follows: $\lambda_{UE-2}^1=\text{Re}\{x_{UE-2}^1\}+j\text{Im}\{x_{UE-2}^2\}$, and $\lambda_{UE-2}^2=\text{Re}\{x_{UE-2}^2\}+j\text{Im}\{x_{UE-2}^1\}$, and $\lambda_{UE-2}^1$, $\lambda_{UE-2}^2\in\Lambda$. Later, when symbol values are mapped to these constellation points in the expanded constellation $\Lambda$, the corresponding in-phase and quadrature-phase components for each original symbol value will be transmitted from the base station using different time and/or frequency resources, e.g., in two consecutive transmissions.

Figure 3:
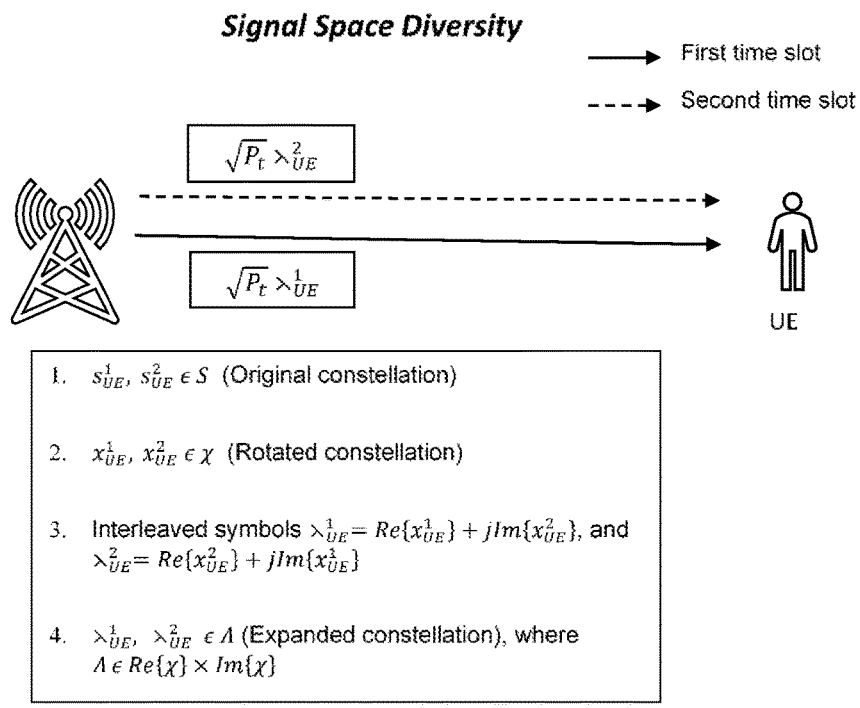
FIG. 3 shows principles of signal space diversity (SSD).

This is shown in FIG. 3. Two symbols to be transmitted to a user, shown in FIG. 3 as "UE" map to first and second points $s_{UE}^1$, $s_{UE}^2$ in the original (unrotated) constellation S. Thus, $s_{UE}^1$, $s_{UE}^2\in S$. These symbols map to corresponding points $x_{UE}^1$, $x_{UE}^2$ in the rotated constellation $\mathcal{X}$, i.e., $x_{UE}^1$, $x_{UE}^2\in \mathcal{X}$. Interleaving the I and Q components of these symbols in the rotated constellation produce interleaved symbols $\lambda_{UE}^1$ and $\lambda_{UE}^2$, i.e.:

$\lambda_{UE}^1=\text{Re}\{x_{UE}^1\}+j\,\text{Im}\{x_{UE}^2\}$, and $\lambda_{UE}^2=\text{Re}\{x_{UE}^2\}+j\,\text{Im}\{x_{UE}^1\}$.

These interleaved symbols are members of the expanded constellation $\Lambda$, i.e., $\lambda_{UE}^1$, $\lambda_{UE}^2\in\Lambda$, where $\Lambda\in\text{Re}\{\mathcal{X}\}\times\text{Im}\{\mathcal{X}\}$. As shown in FIG. 3, these interleaved symbols can be transmitted in separate time slots, e.g., with $\lambda_{UE}^1$ transmitted in a first time slot and $\lambda_{UE}^2$. The consequence of this is that the I and Q components of the symbols as mapped to the rotated constellation $\mathcal{X}$ are transmitted in separate realizations of the channel, thus providing modulation diversity.

The concept of retransmission is applicable to any general spatial modulation scheme. As noted above, however, the combination of OFDM-IM with retransmission is a particularly interesting scheme that could be deployed in LTE and NR, systems, especially in low-rate applications such as IoT.

Figure 4:
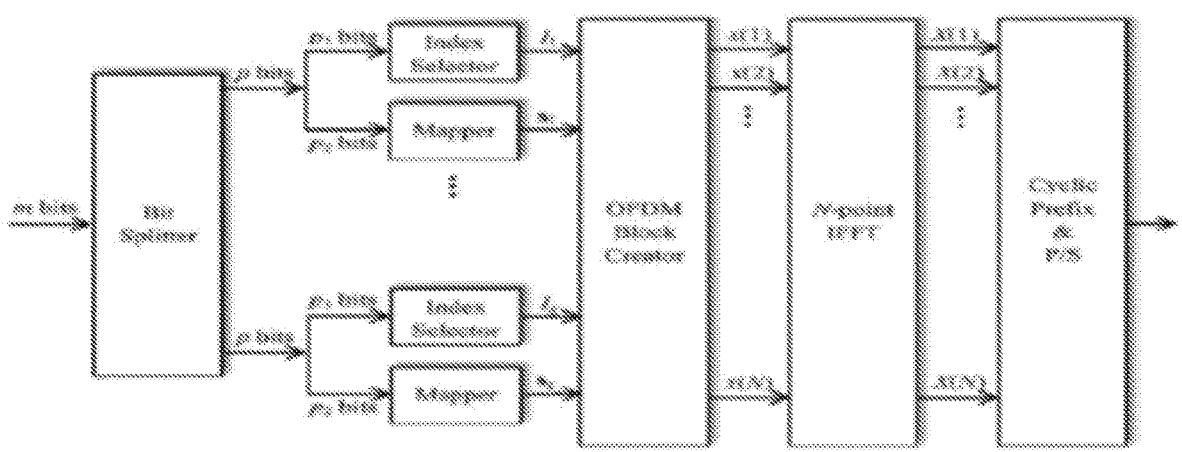
FIG. 4 is a block diagram illustrating components of a transmitter, according to some embodiments.

FIG. 4 illustrates an example of OFDM-IM based transmission as might be performed in a system using conventional orthogonal multiple access (OMA). Here, an OFDM block generates parallel data streams over N subcarriers from an input block of m bits. In standard OFDM, these m bits would be divided and mapped to M constellation points of a conventional modulation scheme like QPSK (M=4), for example, with the resulting modulated symbols then transmitted in corresponding subcarriers. With OFDM-IM, however, the m bits may be divided and mapped to combinations of a QPSK constellation point and index, where each possible index mapping may correspond to a unique subcarrier or group of subcarriers. The mapping to the index thus conveys one or more additional information bits beyond what could be conveyed by mapping only to the modulation symbol.

More particularly, the m-bit data block can be split into G groups, where each group is composed of p bits. Thus, m=pG. Assume that there are N available OFDM subcarriers (e.g., where N is the size of the inverse fast Fourier Transform (IFFT) used to generate the OFDM signal). These N subcarriers can be divided into OFDM subblocks of n subcarriers each, where n=N/G. Then for each one of the G groups of bits, $p_1$ bits are used for index modulation, to select only k out of the n subcarriers in the corresponding OFDM subblock, while the remaining $p_2$ bits are used to independently select one of the M-ary signal constellation points. Thus, $p=p_1+p_2$, $p_1=\text{flood}\lfloor \log 2(C(n; k))\rfloor$ and $p_2=k \log 2(M)$ where (C(n; k)) denotes the binomial coefficient. The constellation point selected by the $p_2$ bits is then transmitted over each of the k subcarriers selected by the $p_1$ bits.

Joining the G complex subblocks (each comprising n subcarriers, only k of which are active, i.e., non-zero) leads to an OFDM block of length N. By applying IFFT, the symbol vectors are transformed into the time domain. To avoid inter-symbol interference (ISI) in addition to the intercarrier interference (ICI), a cyclic prefix (CP) is added before the transmission of each symbol. Then, the signal vectors are fed through the transmitter selective frequency Rayleigh fading channel. At the receiver antenna, CP is removed from the signal vector and Fast Fourier Transform (FFT) is applied to recover values corresponding to each of the N subcarriers.

The idea is that an index selector block maps the incoming bits to a combination of active indices out of possible candidates, and the task of the index de-mapper, at the receiver, is to provide an estimate of these bits by processing the detected active indices provided by maximum likelihood (ML) of the received signals.

One way of mapping is a look-up table. In this mapping method, a look-up table of size c is created for use at both transmitter and receiver sides. At the transmitter, the look-up table is used by the index selector to provide the corresponding indices for the incoming bits for each subblock. The look-up table is used to perform the opposite operation at the receiver, i.e., to map the subcarrier or subcarriers determined to be active in a given OFDM subblock to the corresponding $p_1$ bits. A look-up table example is presented in Table 1 for k=2, n=4, c=4. Since (C(n; k))=6, two combinations out of the six possible unique combinations of two subcarriers are discarded.

TABLE 1

| Bits | Indices | Active subcarriers in subblock |
|---|---|---|
| [0, 0] | {1, 2} | $[s_\chi\ s_\zeta\ 0\ 0]^T$ |
| [0, 1] | {2, 3} | $[0\ s_\chi\ s_\zeta\ 0]^T$ |
| [1, 0] | {3, 4} | $[0\ 0\ s_\chi\ s_\zeta]^T$ |
| [1, 1] | {1, 4} | $[s_\chi\ 0\ 0\ s_\zeta]^T$ |

Consider also the retransmission of the same information. Retransmission may happen if the first transmission is lost or not decoded correctly by the receiver, as detected using, for example, a Hybrid Automatic Repeat Request (HARQ) scheme. Retransmission may comprise a Chase-combining type of retransmission, where the same identical information is retransmitted. The techniques described herein may additionally be applicable to incremental redundancy, according to particular embodiments.

For the purposes of understanding the performance gains that may be made with retransmission, the following simplifying assumptions can be made, without limiting the applicability of the techniques described herein:

The channels between the transmitter and the receiver for the original and all retransmissions are independent and identically distributed channels.

The receiver uses a single receive antenna. However, the techniques may be extended to the case of multi receive antenna, The receiver stores the soft symbols of the original transmission and subsequent retransmissions.

The receiver uses joint maximum likelihood detection, which relies on all soft symbols of the original transmission and all retransmissions. For instance, assuming the received soft symbol vector $r_i$ in the ith transmission, $i \in [0,$ nrofReTxs] is given by:

$r_i=H_i s_i+n_i$, where $H_i$ is a complex n×n diagonal channel matrix in the ith transmission, $s_i(b)$ is a mapping function that maps p bits into a complex vector of size n representing the OFDM-IM subblock transmitted in the ith transmission, and $n_i$ is a complex vector of size n represent complex Gaussian noise. Under these assumptions, the maximum likelihood detector in this case can be expressed as:

$$\arg\min_b \sum_i^{nr\ of\ ReTxs} \|r_i - H_i s_i(b)\|_2^2.$$

In a conventional OFDM-IM scheme, the same mapping is used to map hits to OFDM-IM subblocks in all retransmissions, i.e., $s_i(b)=s_j(b)$, where i≠j. As noted above, however, rearrangement of the bit mapping for retransmission can be used with OFDM-IM. In this case, the mapping from a given value for the p bits in one of the G groups above will differ between the original transmission of a data block and its retransmission. This difference may involve the use of a different look-up table for mapping $p_1$ bits to particular indices. According to particular embodiments, for example, the mapping may be varied using a predetermined rearrangement of bits.

So, several techniques for improving transmission reliability and/or system capacity have been described: (1) signal space diversity (SSD); (2) retransmission, e.g., as used with OFDM-IM, and (3) NOMA. Two or all three of these techniques may be used together, for increased robustness and capacity. In particular, the combination of SSD with retransmission allows the benefits of modulation diversity to be used. This can be of particular benefit in a scenario where NOMA is utilized, to enhance the reliability of transmission to the user assigned a smaller share of the transmission power.

Figure 5:
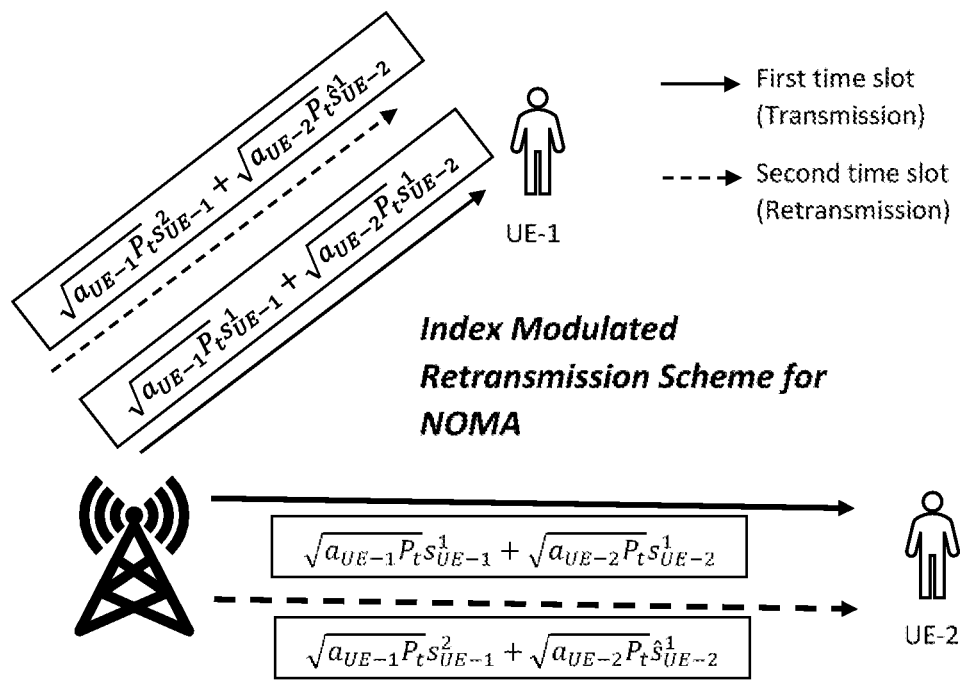
FIG. 5 illustrates a combination of index modulated retransmission scheme with NOMA, according to some embodiments.

FIG. 5 illustrates how retransmission, as used with OFDM-IM, can be combined with NOMA, thereby providing the benefits of symbol-mapping diversity and enhancing the reliability of transmission to the user with the smaller share of the signal power, as compared to NOMA using ordinary retransmissions. In this example, a composite signal formed using power-domain NOMA is transmitted to each of users UE-1 and UE-2 in a first time slot. In the illustrated scenario, it is assumed that UE-2 is unable to successfully demodulate and decode its signal after the first transmission. Thus, the data for UE-2 is retransmitted in the second time slot. However, since transmission of data to UE-1 is successful in the first slot, new data can be transmitted to UE-1 in the second time slot, along with the retransmission of data to UE-2.

In more detail, the composite signal transmitted in the first time slot, to both UE-1 and UE-2, is given by:

$$\sqrt{a_{UE\text{-}1} P_t} s_{UE\text{-}1}{}^1 + \sqrt{a_{UE\text{-}2} P_t} s_{UE\text{-}2}{}^1.$$

Here, $a_{UE\text{-}1}$ and $a_{UE\text{-}2}$ are the shares of the total transmit power $P_t$ allocated to UE-1 and UE-2, respectively; it may be assumed in this example that UE-1 is allocated the larger share. $s_{UE\text{-}1}$ and $s_{UE\text{-}2}$ are the symbols transmitted to UE-1 and UE-2, respectively, in this first time slot. Of course, this first transmission may include multiple symbols for each of UE1 and UE2, e.g., corresponding to multiple OFDM subblocks as disclosed above and/or corresponding to multiple OFDM symbol times; thus $s_{UE\text{-}1}$ and $s_{UE\text{-}2}$ might be understood as vectors of symbols formed from first and second data blocks targeted to UE-1 and UE-2 respectively, where the term "data block" is used herein to refer to a group of data bits targeted to a given user, prior to the mapping of those data bits to modulation symbols.

Again, in the scenario illustrated in FIG. 5, it is assumed that UE-2 is unable to successfully demodulate and decode $s_{UE\text{-}2}^1$, after performing SIC to remove the portion of the signal targeted to UE-1, and is thus unable to successfully recover the data block targeted to it. Accordingly, this data block must be retransmitted. The original data block is mapped to a transmission symbol yields the symbol $\hat{s}_{UE\text{-}2}^1$.

In the illustrated scenario, it is also assumed that the original transmission of $s_{UE\text{-}1}^1$ to UE-1 in the first slot was successful. This means that new data, represented as $s_{UE\text{-}1}^2$, can be transmitted to UE-1 in the second time slot. This new data for UE-1 and the retransmitted data are combined, using NOMA, with the resulting composite signal being:

$$\sqrt{a_{UE\text{-}1}P_t}s_{UE\text{-}1}^2+\sqrt{a_{UE\text{-}2}P_t}\hat{s}_{UE\text{-}2}^1.$$

UE-1 can recover the data targeted to it using conventional techniques. After performing SIC to remove the interference from the signal targeted to UE-1, UE-2 uses the same (or rearranged) constellation to recover its best estimate of the signal targeted to it, and may combine this information with the information obtained from the original transmission, in the first slot, to enhance the chances of successful decoding of the data.

Figure 6:
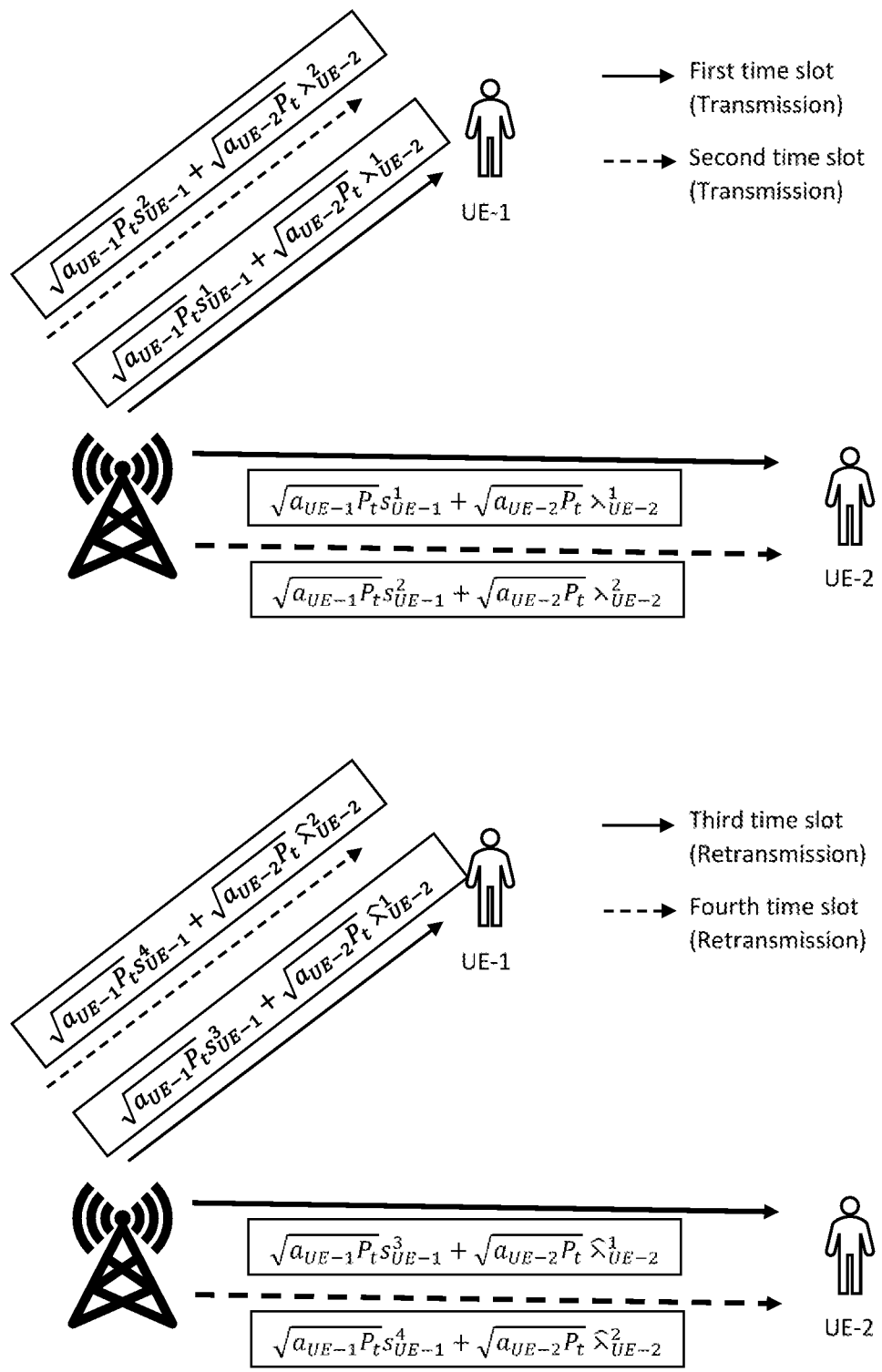
FIG. 6 shows a combination of SSD, index modulation, retransmission, and NOMA, according to some embodiments.

Adding SSD to at least the signal transmitted to UE-2 can improve the chances that UE-2 is able to successfully decode its data. SSD involves transmitting I and Q components of a given symbol of the expanded constellation over separate channel realizations, e.g., in different time slots or time intervals. FIG. 6 illustrates the addition of SSD to the OFDM-IM and NOMA techniques illustrated in FIG. 5, realized as a four time-slot retransmission scheme. The top half of FIG. 6 shows the first two time slots, which are used for an original transmission of data to UE-2, while the bottom half shows the third and fourth time slots, used for the retransmission of data to UE-2. Note that the term "time slot" may refer to any arbitrary interval of time in which one or several symbols may be transmitted to a user. In the discussion of FIG. 6, the "first," "second," "third," and "fourth" time slots occur in that order, and may be separated by any amount of time. The first and second time slots may be, but are not necessarily, immediately consecutive time slots; likewise, the third and fourth time slots may be, but are not necessarily, immediately consecutive time slots.

In FIG. 6, the signals transmitted in the first, second, third, and fourth time slots are given, respectively, by:

$$\sqrt{a_{UE\text{-}1}P_t}s_{UE\text{-}1}^1+\sqrt{a_{UE\text{-}2}P_t}\lambda_{UE\text{-}2}^1;$$

$$\sqrt{a_{UE\text{-}1}P_t}s_{UE\text{-}1}^2+\sqrt{a_{UE\text{-}2}P_t}\lambda_{UE\text{-}2}^2;$$

$$\sqrt{a_{UE\text{-}1}P_t}s_{UE\text{-}1}^3+\sqrt{a_{UE\text{-}2}P_t}\lambda_{UE\text{-}2}^1; \text{ and}$$

$$\sqrt{a_{UE\text{-}1}P_t}s_{UE\text{-}1}^2+\sqrt{a_{UE\text{-}2}P_t}\lambda_{UE\text{-}2}^2.$$

Figure 7:
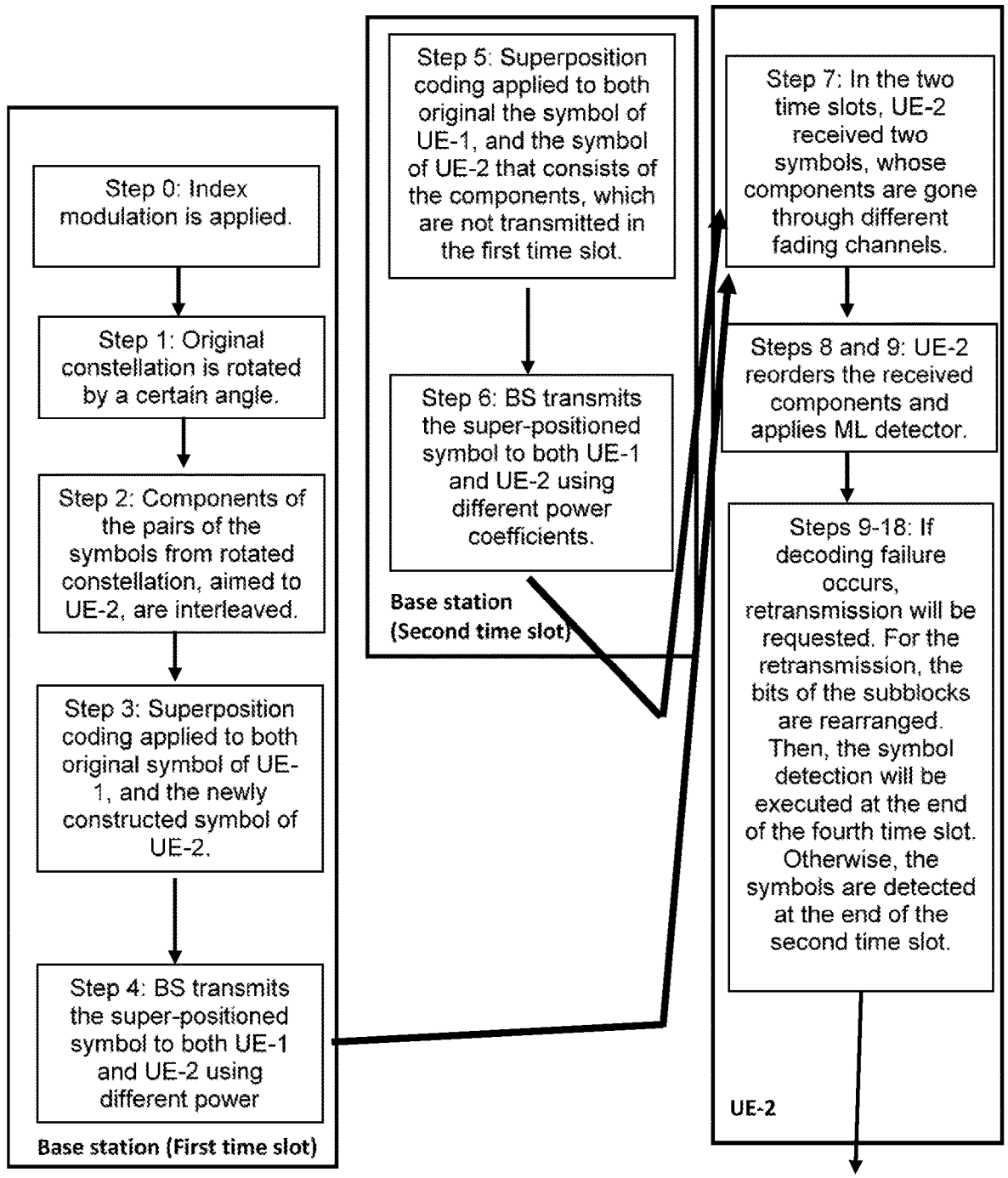
FIG. 7 illustrates steps of an example transmission and reception process, according to some embodiments.

These signals are formed according to the algorithm that follows, which is illustrated in FIG. 7. Note that certain details are described here only for the second user, i.e., UE-2. OFDM-IM and/or SSD may be, but are not necessarily, also performed for the transmissions to UE-1.

Steps 0-4 are performed for the first time-slot:

Step-0: At the base station (BS), index modulation is applied to the data to be transmitted, to form first and second index modulated symbols ($s_{UE\text{-}2}^1$, $s_{UE\text{-}2}^2$) for UE-2.

Step-1: At the BS, the original index modulated symbols (i.e., $s_{UE\text{-}2}^1$, $s_{UE\text{-}2}^2$) aimed to UE-2 are rotated by a certain angle, e.g., by 26.6 degrees. The angle may be selected so that the symbols of the rotated constellation have unique amplitudes in the I and Q dimensions.

Step-2: In-phase and quadrature components of the rotated symbols for UE-2 are interleaved, to obtain $\lambda_{UE\text{-}2}^1$ and $\lambda_{UE\text{-}2}^2$. These may be referred to as "interleaved modulation symbols."

Step-3: After any additional modulation steps for the symbols targeted to UE-2 (e.g., performing an IFFT to obtain an OFDM signal), the signals intended for the two NOMA users, i.e., UE-1 and UE-2, are superposed, to obtain $\sqrt{a_{UE\text{-}1}P_t}s_{UE\text{-}1}^1+\sqrt{a_{UE\text{-}2}P_t}\lambda_{UE\text{-}2}^1$.

Step-4: The superposed signal is transmitted to UE-1 and UE-2.

Steps 5-10 are performed for the second time-slot:

Step-5: The signals intended for the two NOMA users, i.e., UE-1 and UE-2, are superposed, to obtain $\sqrt{a_{UE\text{-}1}P_t}s_{UE\text{-}1}^2+\sqrt{a_{UE\text{-}2}P_t}\lambda_{UE\text{-}2}^2$.

Step-6: The superposed signal is transmitted to UE-1 and UE-2.

Step-7: At the receiver for UE-2, the received signals in the first and second time slots can be given as $$y_1=h_1\sqrt{a_{UE\text{-}2}P_t}[R\{s_{UE\text{-}2}^1\}+jI\{s_{UE\text{-}2}^2\}]+n_1$$

$$y_2=h_2\sqrt{a_{UE\text{-}2}P_t}[R\{s_{UE\text{-}2}^2\}+jI\{s_{UE\text{-}2}^1\}]+n_2$$

Step-8: UE-2 reorders the received components, and the signal after reordering the received components is as follows:

$$r_1=R\{h_1^*y_1\}=|h_1|^2\sqrt{a_{UE\text{-}2}P_t}R\{s_{UE\text{-}2}^1\}+n_1$$

$$r_2=I\{h_1^*y_1\}=|h_1|^2\sqrt{a_{UE\text{-}2}P_t}I\{s_{UE\text{-}2}^2\}+n_2$$

$$r_3=R\{h_2^*y_2\}=|h_2|^2\sqrt{a_{UE\text{-}2}P_t}R\{s_{UE\text{-}2}^2\}+n_3$$

$$r_4=I\{h_1^*y_1\}=|h_2|^2\sqrt{a_{UE\text{-}2}P_t}I\{s_{UE\text{-}2}^2\}+n_4$$

Step-9: UE-2 applies a maximum likelihood (ML) detection on the reordered signals for the subblock as follows:

$$\arg\min_{i_1,i_2,s_{UE-2}^1,s_{UE-2}^2} \Big( |r_1(i_1)-|h_1(i_1)|^2\sqrt{a_{UE-2}P_t}R\{s_{UE-2}^1\}|^2 +$$
$$|r_4(i_2)-|h_2(i_2)|^2\sqrt{a_{UE-2}P_t}I\{s_{UE-2}^1\}|^2 +$$
$$( |r_2(i_1)-|h_1(i_1)|^2\sqrt{a_{UE-2}P_t}I\{s_{UE-2}^2\}|^2 + |r_3(i_2)-$$
$$|h_2(i_2)|^2\sqrt{a_{UE-2}P_t}R\{s_{UE-2}^2\}|^2 \Big)$$

The above ML detector searches through all possible subcarrier index combinations and the signal constellation points to give a joint decision on the active indices and the constellation symbols for the subblock.

Step-10: If the decoding failure occurs, retransmission by the base station is requested. This may be done, for example, using conventional ACK/NACK signaling.

Steps 11-15 are performed for the third time-slot:

Step-11: By rearranging the mapping in retransmissions, we can enhance the frequency diversity and hence significantly improve the reliability of the wireless systems. The mapping may be varied, for example, by using a rearrangement of bits to indices in intra-subblock manner. According to this approach, within each subblock, the bits used for the symbol remain unchanged, but the bits used for the subcarrier indices are swapped, from the original transmission to the retransmission. This swapping may be symmetric. Given a set of bits, a symmetric swap exchanges two bits in this set that are the same distance from the ends. For example, in a scheme where there are four bits mapped to indices, swapping the "0" at the beginning and the "1" at the end of the "0111" set to obtain the "1110" set would be a symmetric swap. In an example where there are two bits mapped to indices, swapping the "0" at the beginning and the "1" at the end of the set "01" to obtain the "10" set would be a symmetric swap. In both examples, the same modulation symbols are sent at each transmission, but over different subcarriers selected by the index modulation scheme. (Because of the SSD, these modulation symbols wilt be interleaved modulation symbols). Note that such approach will not increase the decoding complexity at UE side since the subcarrier indices used in the retransmission can be obtained by knowing the subcarrier indices in the first transmission.

Table 2 illustrates another example for n=4, k=2, 4-QAM. Here, the two last bits of each subblock are for the subcarrier indices; these bits are swapped from the first transmission to the second transmission.

TABLE 2

|  | Subblock-1 | Subblock-2 |
| --- | --- | --- |
| First transmission | 0010 | 1110 |
| Second transmission | 00<u>01</u> | 11<u>01</u> |

Step-12: At the BS, the same modulation constellation used for the original transmission is used. The symbols (i.e., $\hat{s}_{UE-2}^1$, $\hat{s}_{UE-2}^2$) of this modulation constellation are rotated by a particular angle, e.g., by 26.6 degrees. The angle may be selected so that the symbols of the rotated constellation have unique amplitudes in the I and Q dimensions.

Step-13: In-phase and quadrature components of the rotated symbols for UE-2 are interleaved to obtain $x_{UE-2}^1$ and $x_{UE-2}^2$, the interleaved modulation symbols Step-14: Superpose the signals intended for the two NOMA users, i.e., UE-1 and UE-2, and obtain $\sqrt{a_{UE-1}P_t}s_{UE-1}^3 + \sqrt{a_{UE-2}P_t}x_{UE-2}^1$.

Step-15: Transmit the superposed signal to UE-1 and UE-2.

Steps 16-18 are performed for the fourth time-slot:

Step-16: Superpose the signals intended for the two NOMA users, i.e., UE-1 and UE-2, and obtain $\sqrt{a_{UE-1}P_t}s_{UE-1}^4 + \sqrt{a_{UE-2}P_t}x_{UE-2}^2$.

Step-17: Transmit the superposed signal to UE-1 and UE-2.

Step-18: The UE-2 reorders the symbols received over four time slots and performs the detection.

$$\arg\min_{I,s} \begin{pmatrix} (|r_1(i_1) - |h_1(i_1)|^2 \sqrt{a_{UE-2}P_T} R \\ \{s_{UE-2}^1\}|^2 + |r_4(i_2) - |h_2(i_2)|^2 \sqrt{a_{UE-2}P_t} I\{s_{UE-2}^1\}|^2) + \\ (|r_2(i_1) - |h_1(i_1)|^2 \sqrt{a_{UE-2}P_t} I\{s_{UE-2}^1\}|^2) + \\ |r_3(i_2) - |h_2(i_2)|^2 \sqrt{a_{UE-2}P_t} R\{s_{UE-2}^2\}|^2) + \\ (|r_1^{ret}(i_3) - |h_1^{ret}(i_3)|^2 \sqrt{a_{UE-2}P_T} R \\ \{s_{UE-2}^1\}|^2 + |r_4^{ret}(i_4) - |h_2^{ret}(i_4)|^2 \sqrt{a_{UE-2}P_t} I\{s_{UE-2}^1\}|^2) + \\ (|r_2^{ret}(i_3) - |h_1^{ret}(i_3)|^2 \sqrt{a_{UE-2}P_t} I \\ \{s_{UE-2}^2\}|^2 + |r_3^{ret}(i_4) - |h_2^{ret}(i_4)|^2 \sqrt{a_{UE-2}P_T} R\{s_{UE-2}^2\}|^2) \end{pmatrix}$$

Note that two symbols for UE-2 rather than one symbol will be detected at the end of the four time-slots retransmission schemes.

Figure 8:
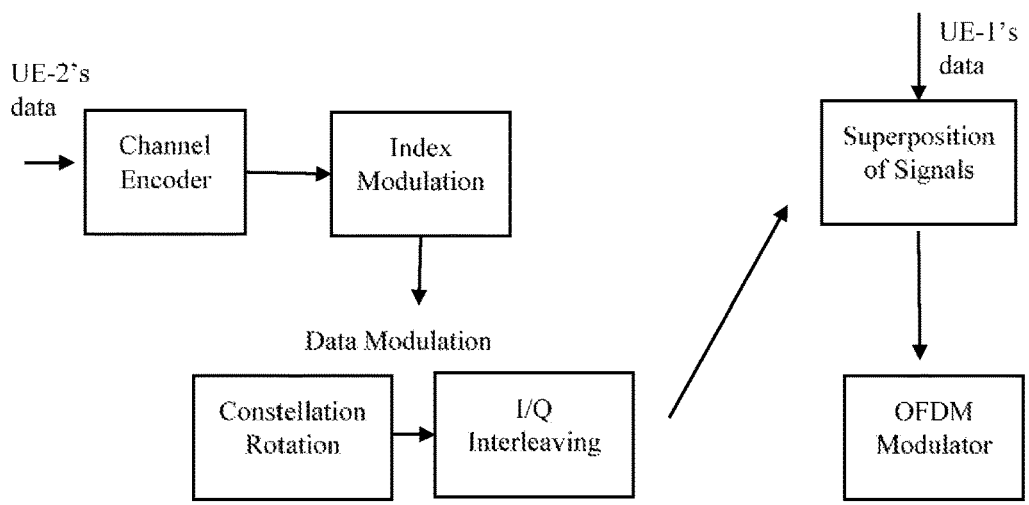
FIG. 8 is a block diagram illustrating functional elements of a transmitter circuit, according to some embodiments.

FIG. 8 illustrates an example of the functional blocks that might be found in a transmitter circuit configured to carry out the techniques described above, e.g., in a base station. These functional blocks are illustrated from the perspective of performing SSD and OFDM-IM for the signal targeted to UE-2, before combining the signals for UE-1 and UE-2. Although not illustrated here, OFDM-IM and/or SSD may be performed for the signal targeted to UE-1, as well.

As seen in the figure, a data block targeted for UE-2 is processed by an encoder block and an index modulation block, with the latter mapping encoded bits to modulation symbols in an M-ary constellation and to one or more indices, e.g., according to OFDM-IM as described above. Next, SSD is applied to the symbols so formed, in the constellation rotation and IQ interleaving blocks, yielding symbols with interleaved I and Q components for transmission in first and second time slots. In each of these time slots, the signal for UE-2 is combined with a signal for UE-1, in the superposition of signals block. Finally, OFDM modulation is performed, in the OFDM modulator block. It should be appreciated that these same functional blocks are used for transmissions and retransmissions, but with rearrangement of the mapping of bits to indices for the OFDM-IM scheme for retransmissions, relative to original transmissions.

Figure 9:
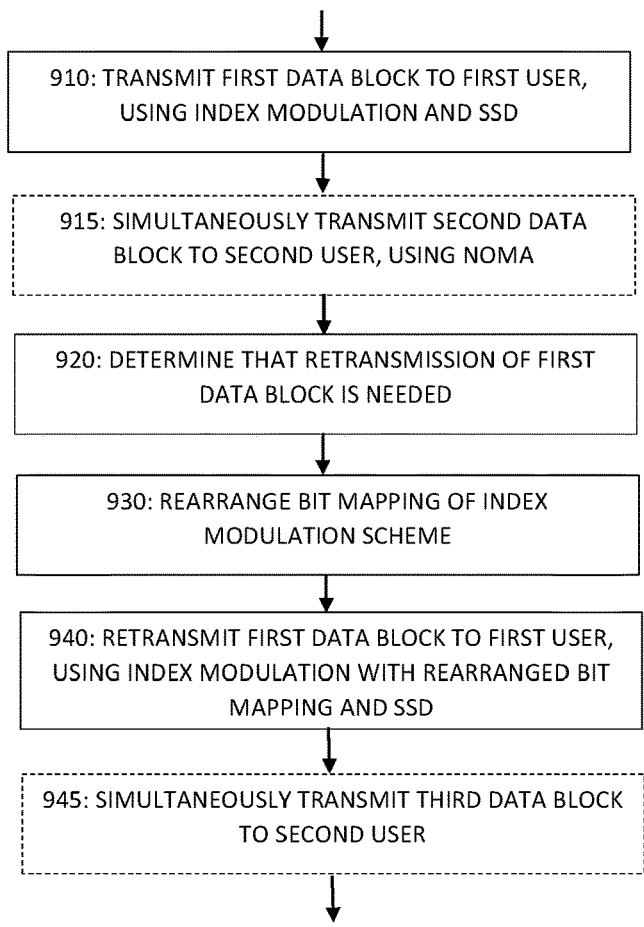
FIG. 9 is a process flow diagram illustrating an example method in a transmitter, according to some embodiments.

In view of the detailed examples and explanation provided above, it will be appreciated that FIG. 9 illustrates an example method, as carried out by a transmitter, in accordance with several embodiments of the presently disclosed techniques.

As shown at block 910, the illustrated method includes the step of transmitting a first data block to a first user, using an index modulation scheme and using SSD for transmitting the first data block. In some embodiments, the index modulation scheme is index-modulated OFDM and the indices comprise subcarrier indices.

For the purposes of the present disclosure, the phrase "using SSD for transmitting" a data block refers to a process that includes (a) rotating a constellation used for the transmitting or retransmitting, so that all of the constellation points in the constellation have unique in-phase components and unique quadrature components, (b) deriving symbols to be transmitted according to the rotated constellation from the data block, and (c) interleaving in-phase and quadrature components among the symbols to be transmitted or retransmitted, to obtain interleaved modulation symbols for the transmitting or retransmitting, so that the in-phase and quadrature components of each interleaved symbol correspond to different ones of the symbols before interleaving. Note also that the term "data block," as used here and elsewhere in the present discussion, should be understood, unless its context demands otherwise, as referring to data prior to encoding and modulating. Thus, it can be said that a data block is transmitted and that the same data block is retransmitted, even if the encoding and/or modulation is different for the retransmission. Finally, note that this transmitting of the first data block may comprise transmitting in one or several time slots, in various embodiments.

As shown at block 920, the illustrated method further comprises determining that a retransmission of the first data block to the first user is needed. This may be done using an automatic repeat request (ARQ) scheme for example, e.g., by detecting a negative acknowledgement (NACK) sent back by the first user, or by failing to detect a positive acknowledgement (ACK) sent back by the first user.

As shown at block 930, the method further comprises rearranging a bit mapping of bits in the first data block to indices used in the index modulation scheme, compared to a bit mapping previously used for transmitting the first data block to the first user using the index modulation scheme. The method further comprises, as shown at block 940, retransmitting the second data block to the first user, where this retransmitting comprises using the index modulation scheme with the rearranged bit mapping and using SSD.

Figure 10:
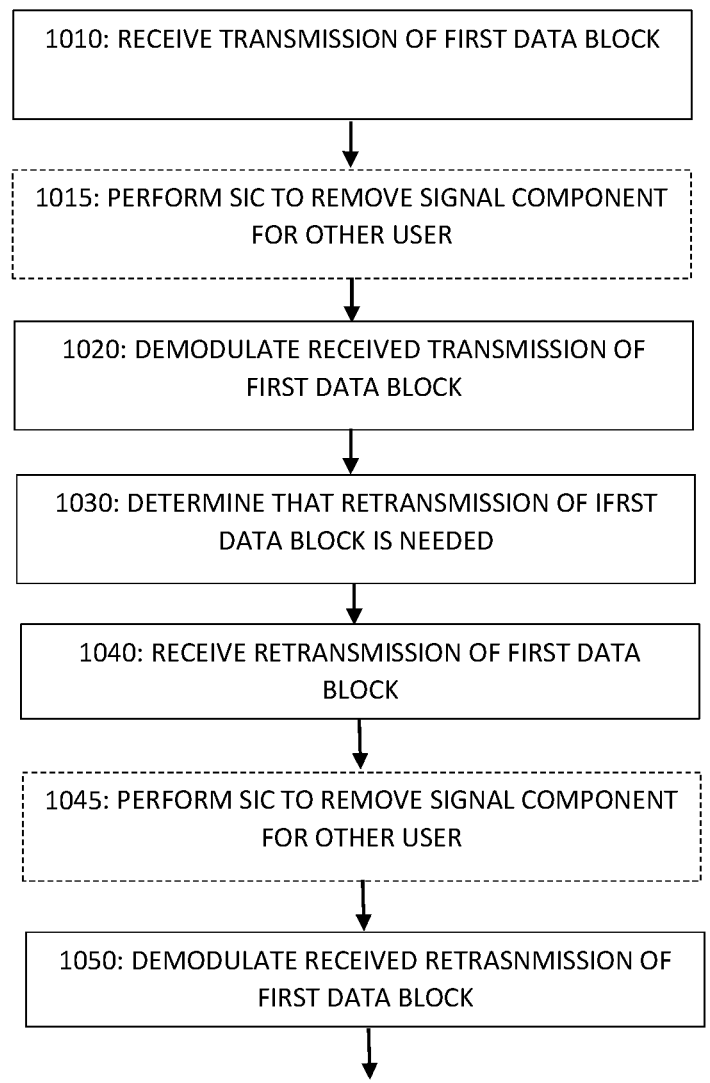
FIG. 10 is a process flow diagram illustrating an example method in a receiver, according to some embodiments.

In some embodiments, the method may comprise transmitting a second data block to a second user, simultaneously with transmitting the first data block to the first user, using power-domain non-orthogonal multiple access (NOMA) with respect to the first and second users. This is shown at block 915, which, like several other blocks in FIG. 9 and FIG. 10, is illustrated with a dashed outline to indicate that it need not be present in every instance or embodiment of the illustrated method. In some embodiments, transmitting the second data block to the second user is also performed using the index modulation scheme and/or using SSD.

Likewise, the method may comprise transmitting a third data block to the second user, simultaneously with retransmitting the first data block to the first user, using power-domain NOMA with respect to the first and second users. This is shown at block 945. Note that this third data block may comprise new data, compared to the second data block that was earlier transmitted to the second user. Alternatively, the method may comprise determining that a retransmission of the second data block to the second user is also needed, in which case the method may comprise retransmitting the second data block to the second user, simultaneously with retransmitting the first data block to the first user, using power-domain NOMA with respect to the first and second users. This alternative is not illustrated in FIG. 9.

In embodiments of the illustrated method, using SSD for transmitting the first data block may comprise transmitting first and second interleaved modulation symbols in first and second time slots, respectively, the first interleaved modulation symbol having an in-phase component from a first one of the symbols to be transmitted and having a quadrature component from a second one of the symbols to be transmitted and the second interleaved modulation symbol having a quadrature component from the first one of the symbols to be transmitted and having an in-phase component from the second one of the symbols to be transmitted.

Note that here and in the detailed examples provided above, SSD is described in such a way that the interleaved I and Q components of symbols are transmitted across two time slots. However, the term "time slot" as used herein should be understood as referring to an interval of any arbitrary length, whether or not the name "time slot" is explicitly assigned (e.g., by specification) to a specific. Thus, a time slot may comprise multiple OFDM symbol intervals and SSD may be performed in such a way that interleaved I and Q components are not spread across boundaries between designated "time slots."

The detailed examples and explanation above focused primarily on forming and transmitting a signal. It will be understood, of course, that complementary techniques may be used to receive and demodulate the transmitted signal, thereby recovering the transmitted and/or retransmitted data blocks. These techniques generally involve reversing the processes used to form and transmit the signal; thus, referring back to FIG. 4 and working backwards, after synchronizing with the symbol timing of the received signal a receiver will perform an N-point FFT on the received signal, recovering a complex symbol value corresponding to each of the N subcarriers. This may be done for multiple symbol intervals or time slots, after which the SSD can be reversed by de-interleaving the I and Q components of symbols from different OFDM symbol intervals or time slots and reversing the constellation rotation that was applied at the transmitter. The receiver then groups the N de-interleaved and de-rotated complex symbol values according to the same subblocks defined for the transmitter, and determines which k of the n subcarriers are active, i.e., which carry modulated signal energy, and determines which constellation point the modulated signal energy most closely corresponds to. This information is then mapped back to groups of p bits, using the same mapping that was used to create the index modulated OFDM signal at the transmitter; the groups of p bits can be reassembled to form the m bits. When retransmission is performed, the information obtained from the original transmission and the retransmission can be combined after the de-mapping, to form more accurate estimates of the m bits.

FIG. 10 is a process flow diagram illustrating an example method, complementing that shown in FIG. 9, as performed in a receiver. The method includes, as shown at block 1010, the step of receiving a transmission of a first data block. The method further comprises the step of demodulating the received transmission of the first data block, where said demodulating comprises reversing an index modulation scheme and SSD used to transmit the first data block. This is shown at block 1020. In some embodiments, the index modulation scheme is index-modulated OFDM and the indices comprise subcarrier indices. As used herein, the phrase "reversing SSD" used to transmit or retransmit a data block should be understood to refer to a process that includes at least (a) de-interleaving in-phase and quadrature components among the received symbols of the transmission or retransmission, and (b) de-rotating a constellation used for the transmitting or retransmitting.

The method further comprises, as shown at block 1030, determining that a retransmission of the first data block is needed. This may be done by, for example, attempting to decode the first data block and determining that the decoding has failed, e.g., by determining that a cyclic redundancy check (CRC) checksum is incorrect. Although not shown in FIG. 10, the receiver may then transmit a NACK in some embodiments, in response to determining that a retransmission is needed. In some embodiments, the receiver may simply refrain from transmitting an ACK.

As shown at block 1040, the method continues with receiving a retransmission of the first data block. As shown at block 1050, the method includes demodulating the received retransmission of the first data block, where demodulating of the received retransmission comprises reversing an index modulation scheme and SSD used to retransmit the first data block. Here, reversing the index modulation scheme used to retransmit the first data block comprises using a rearranged bit mapping of bits in the first data block to indices used in the index modulation scheme, compared to a bit mapping previously used for transmitting the first data block to the first user using the index modulation scheme.

In some embodiments, the signal targeted to the receiver has been combined with a signal targeted to another user, using NOMA. In some embodiments, then, the method comprises, prior to each demodulating step, performing successive interference cancellation (SIC) on a received radio signal to remove a signal component superimposed on the transmission or retransmission of the first data block using power-domain NOMA. This is shown at blocks 1015 and 1045.

In embodiments of the illustrated embodiment, reversing SSD used to transmit or retransmit a data block may comprise receiving first and second interleaved modulation symbols in first and second time slots, respectively, and de-interleaving in-phase and quadrature components by combining an in-phase component from the first interleaved modulation symbol with a quadrature component from the second interleaved modulation symbol and combining a quadrature component from the first interleaved modulation symbol and an in-phase component from the second interleaved modulation symbol, to form first and second de-interleaved symbols, respectively. Again, however, the term "time slot" as used herein should be understood as referring to an interval of any arbitrary length, whether or not the name "time slot" is explicitly assigned (e.g., by specification) to a specific. Thus, a time slot may comprise multiple OFDM symbol intervals and SSD may be performed in such a way that interleaved I and Q components are not spread across boundaries between designated "time slots."

Figure 11:
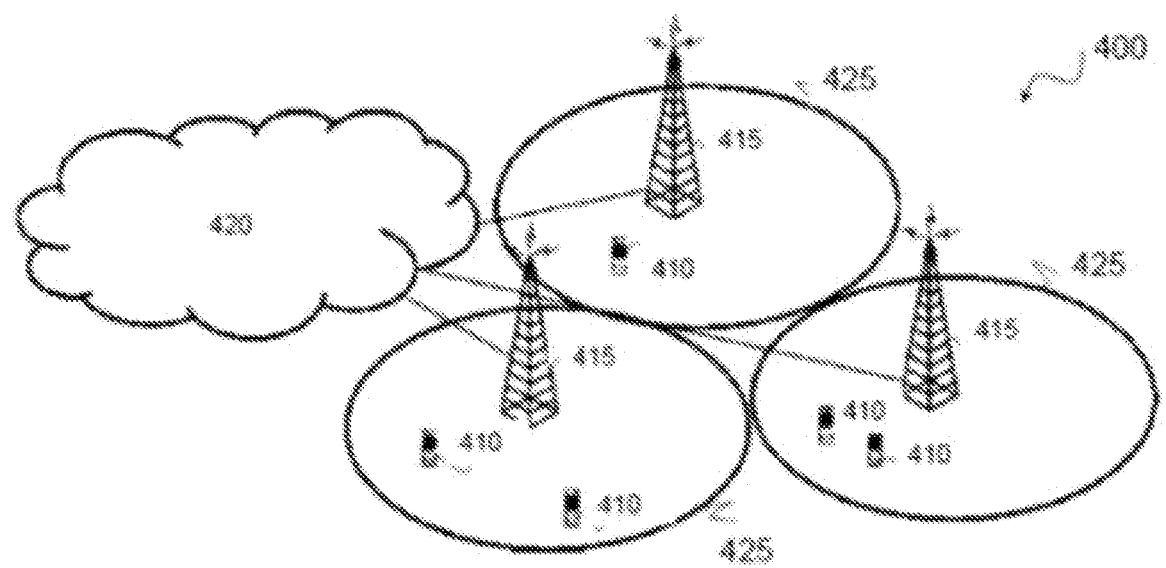
FIG. 11 illustrates an example network in which the presently disclosed techniques and apparatuses may be deployed.

FIG. 11 illustrates an example embodiment of a network 400 for implementing a retransmission scheme for improved BER performance in a transmitter and receiver, in accordance with certain embodiments. Network 400 includes one or more UE(s) 410 (which may be interchangeably referred to as wireless devices 410) and one or more network node(s) 415 (which may be interchangeably referred to as gNBs 415). UEs 410 may communicate with network nodes 415 over a wireless interface. For example, a UE 410 may transmit wireless signals to one or more of network nodes 415, and/or receive wireless signals from one or more of network nodes 415. The wireless signals may contain voice traffic, data traffic, control signals, and/or any other suitable information. In some embodiments, an area of wireless signal coverage associated with a network node 415 may be referred to as a cell 425. In some embodiments, UEs 410 may have device-to-device (D2D) capability. Thus, UEs 410 may be able to receive signals from and/or transmit signals directly to another UE.

In certain embodiments, network nodes 415 may interface with a radio network controller. The radio network controller may control network nodes 415 and may provide certain radio resource management functions, mobility management functions, and/or other suitable functions. In certain embodiments, the functions of the radio network controller may be included in network node 415. The radio network controller may interface with a core network node. In certain embodiments, the radio network controller may interface with the core network node via an interconnecting network 420. Interconnecting network 420 may refer to any interconnecting system capable of transmitting audio, video, signals, data, messages, or any combination of the preceding. Interconnecting network 420 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 410. UEs 410 may exchange certain signals with the core network node using the non-access stratum (NAS) layer. In non-access stratum signaling, signals between UEs 410 and the core network node may be transparently passed through the radio access network. In certain embodiments, network nodes 415 may interface with one or more network nodes over an internode interface.

As described above, example embodiments of network 400 may include one or more wireless devices 410, and one or more different types of network nodes capable of communicating (directly or indirectly) with wireless devices 410.

In some embodiments, the non-limiting term UE is used. UEs 410 described herein can be any type of wireless device capable of communicating with network nodes 415 or another UE over radio signals. UE 410 may also be a radio communication device, target device, D2D UE, NB-IoT device, MTC UE or UE capable of machine-to-machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc.

Also, in some embodiments, generic terminology "radio network node" (or simply "network node") is used. It can be any kind of network node, which may comprise a gNB, base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and, in particular, does not imply a certain hierarchical relation between the two; in general, "eNodeB" could be considered as device 1 and "UE" device 2, and these two devices communicate with each other over some radio channel. Network node 415 may include one or more of transceiver 610, processing circuitry 620 (e.g., which may include one or more processors), memory 630, and network interface 640. In some embodiments, transceiver 610 facilitates transmitting wireless signals to and receiving wireless signals from wireless device 410 (e.g., via antenna 650), processing circuitry 620 executes instructions to provide some or all of the functionality described above as being provided by a network node 415, memory 630 stores the instructions executed by processing circuitry 620, and network interface 640 communicates signals to backend network components, such as a gateway, switch, router, Internet, Public Switched Telephone Network (PSTN), core network nodes or radio network controllers, etc.

Figure 12:
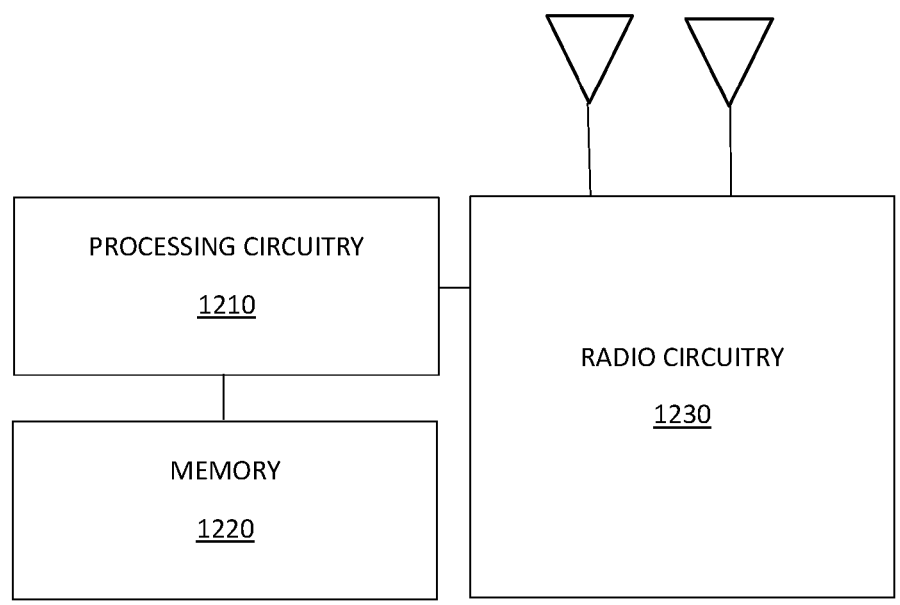
FIG. 12 is a block diagram illustrating an example receiver and transmitter, according to various embodiments.

Either or both of wireless devices 410 and network nodes 415 may comprise transmitter circuits configured to carry out a method like those illustrated in FIG. 9 or receiver circuits configured to carry out a method like those illustrated in FIG. 10, or both. FIG. 12 illustrates an example device, which may correspond to either a wireless device 410 or a network node 415, in some embodiments. The device shown in FIG. 12 comprises processing circuitry 1210, which is operatively coupled to memory 1220 and radio circuitry 1230, which in turn is coupled to one or more antennas. Processing circuitry 1210 and radio circuitry 1230 together may be configured to act as a receiver, or a transmitter, or both, in various embodiments.

Processing circuitry 1210 may include one or more microprocessors, microcontrollers, digital signal processors, and other digital hardware, and may be configured to execute instructions and manipulate data stored in memory 1220, to perform some or all of the receiver and/or transmitter functions described herein. In particular, processing circuitry 1210, memory 1220, and radio circuitry 1230 may be configured, e.g., with appropriate program instructions stored in memory 1220, to carry out any one or more methods like those described above in connection with FIGS. 9 and 10.

Memory 1220 is generally operable to store instructions, such as a computer program, software, an application including one or more of logic, rules, algorithms, code, tables, etc. and/or other instructions capable of being executed by a processor. Examples of memory 1220 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

According to certain embodiments, a computer program product comprises program instructions for execution by a processing circuit, for performing any of the methods described above. According to certain embodiments, a non-transitory computer readable medium, such as memory 1220, stores a computer program product like that described above.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

What is claimed is:

1. A method, in a transmitter, the method comprising:
    transmitting a first data block to a first user, using an index modulation scheme and using signal space diversity (SSD) for transmitting the first data block;
    determining that a retransmission of the first data block to the first user is needed;
    rearranging a bit mapping of bits in the first data block to indices used in the index modulation scheme, compared to a bit mapping previously used for transmitting the first data block to the first user using the index modulation scheme; and
    retransmitting the second data block to the first user, using the index modulation scheme with the rearranged bit mapping and using SSD for retransmitting the second data block.

2. The method of claim 1, wherein the method comprises transmitting a second data block to a second user, simultaneously with transmitting the first data block to the first user, using power-domain non-orthogonal multiple access (NOMA) with respect to the first and second users.

3. The method of claim 2, wherein the method comprises transmitting a third data block to the second user, simultaneously with retransmitting the first data block to the first user, using power-domain NOMA with respect to the first and second users.

4. The method of claim 2, wherein the method further comprises:
    determining that a retransmission of the second data block to the second user is needed; and
    retransmitting the second data block to the second user, simultaneously with retransmitting the first data block to the first user, using power-domain NOMA with respect to the first and second users.

5. The method of claim 1, wherein transmitting the second data block to the second user is performed using the index modulation scheme and using SSD.

6. The method of claim 1, wherein using SSD for transmitting the first data block comprises transmitting first and second interleaved modulation symbols in first and second time slots, respectively, the first interleaved modulation symbol having an in-phase component from a first one of the symbols to be transmitted and having a quadrature component from a second one of the symbols to be transmitted and the second interleaved modulation symbol having a quadrature component from the first one of the symbols to be transmitted and having an in-phase component from the second one of the symbols to be transmitted.

7. The method of claim 1, wherein the index modulation scheme is index-modulated Orthogonal Frequency-Division Multiplexing (OFDM) and wherein the indices comprise subcarrier indices.

8. A method, in a receiver, the method comprising:
    receiving a transmission of a first data block;
    demodulating the received transmission of the first data block, wherein said demodulating comprises reversing an index modulation scheme and signal space diversity (SSD) used to transmit the first data block;
    determining that a retransmission of the first data block is needed;
    receiving a retransmission of the first data block; and
    demodulating the received retransmission of the first data block, wherein said demodulating of the received retransmission comprises reversing an index modulation scheme and SSD used to retransmit the first data block, wherein reversing the index modulation scheme used to retransmit the first data block comprises using a rearranged bit mapping of bits in the first data block to indices used in the index modulation scheme, compared to a bit mapping previously used for transmitting the first data block to the first user using the index modulation scheme.

9. The method of claim 8, wherein the method further comprises, prior to each said demodulating, performing successive interference cancellation (SIC) on a received radio signal to remove a signal component superimposed on the transmission or retransmission of the first data block using power-domain non-orthogonal multiple access (NOMA).

10. The method of claim 8, wherein reversing SSD used to transmit or retransmit a data block comprises receiving first and second interleaved modulation symbols in first and second time slots, respectively, and de-interleaving in-phase and quadrature components by combining an in-phase component from the first interleaved modulation symbol with a quadrature component from the second interleaved modulation symbol and combining a quadrature component from the first interleaved modulation symbol and an in-phase component from the second interleaved modulation symbol, to form first and second de-interleaved symbols, respectively.

11. The method of claim 8, wherein the index modulation scheme is index-modulated Orthogonal Frequency-Division Multiplexing (OFDM) and wherein the indices comprise subcarrier indices.

12. A transmitter circuit comprising:
radio circuitry configured to transmit radio signals via one or more antennas;
a memory storing instructions;
processing circuitry operably coupled to the radio circuitry and the memory and configured to execute the instructions, whereby the transmitter circuit is configured to:
transmit a first data block to a first user, using an index modulation scheme and using signal space diversity (SSD) for transmitting the first data block;
determine that a retransmission of the first data block to the first user is needed;
rearrange a bit mapping of bits in the first data block to indices used in the index modulation scheme, compared to a bit mapping previously used for transmitting the first data block to the first user using the index modulation scheme; and
retransmit the second data block to the first user, using the index modulation scheme with the rearranged bit mapping and using SSD for the retransmitting of the second data block.

13. The transmitter circuit of claim 12, wherein the transmitter circuit is configured to transmit a second data block to a second user, simultaneously with transmitting the first data block to the first user, using power-domain non-orthogonal multiple access (NOMA) with respect to the first and second users.

14. The transmitter circuit of claim 13, wherein the transmitter circuit is configured to transmit a third data block to the second user, simultaneously with retransmitting the first data block to the first user, using power-domain NOMA with respect to the first and second users.

15. The transmitter circuit of claim 13, wherein the transmitter circuit is configured to:
determine that a retransmission of the second data block to the second user is needed; and
retransmit the second data block to the second user, simultaneously with retransmitting the first data block to the first user, using power-domain NOMA with respect to the first and second users.

16. The transmitter circuit of claim 15, wherein the transmitter circuit is configured to transmit the second data block to the second user using the index modulation scheme and using SSD.

17. The transmitter circuit of claim 12, wherein the transmitter circuit is configured to use SSD for transmitting the first data block by transmitting first and second interleaved modulation symbols in first and second time slots, respectively, the first interleaved modulation symbol having an in-phase component from a first one of the symbols to be transmitted and having a quadrature component from a second one of the symbols to be transmitted and the second interleaved modulation symbol having a quadrature component from the first one of the symbols to be transmitted and having an in-phase component from the second one of the symbols to be transmitted.

18. The transmitter circuit of claim 12, wherein the index modulation scheme is index-modulated OFDM and wherein the indices comprise subcarrier indices.

19. A receiver circuit comprising:
radio circuitry configured to receive radio signals obtained from one or more antennas;
a memory storing instructions;
processing circuitry operably coupled to the radio circuitry and the memory and configured to execute the instructions, whereby the receiver circuit is configured to:
receive a transmission of a first data block;
demodulate the received transmission of the first data block, wherein said demodulating comprises reversing an index modulation scheme and signal space diversity (SSD) used to transmit the first data block;
determine that a retransmission of the first data block is needed;
receive a retransmission of the first data block; and
demodulate the received retransmission of the first data block, wherein said demodulating of the received retransmission comprises reversing an index modulation scheme and SSD used to retransmit the first data block, wherein reversing the index modulation scheme used to retransmit the first data block comprises using a rearranged bit mapping of bits in the first data block to indices used in the index modulation scheme, compared to a bit mapping previously used for transmitting the first data block to the first user using the index modulation scheme.

20. The receiver circuit of claim 19, wherein the receiver circuit is configured to, prior to each said demodulating, perform successive interference cancellation (SIC) on a received radio signal to remove a signal component superimposed on the transmission or retransmission of the first data block using power-domain non-orthogonal multiple access (NOMA).

21. The receiver circuit of claim 19, wherein the receiver circuit is configured to reverse SSD used to transmit or retransmit a data block by receiving first and second interleaved modulation symbols in first and second time slots, respectively, and de-interleaving in-phase and quadrature components by combining an in-phase component from the first interleaved modulation symbol with a quadrature component from the second interleaved modulation symbol and combining a quadrature component from the first interleaved modulation symbol and an in-phase component from the second interleaved modulation symbol, to form first and second de-interleaved symbols, respectively.

22. The receiver circuit of claim 19, wherein the index modulation scheme is index-modulated Orthogonal Frequency-Division Multiplexing (OFDM) and wherein the indices comprise subcarrier indices.

* * * * *